Patented June 30, 1931

1,812,528

UNITED STATES PATENT OFFICE

REINHOLD GRÜTER, OF BERLIN-CHARLOTTENBURG, GERMANY

PHARMACEUTICAL PRODUCT

No Drawing. Application filed May 19, 1927, Serial No. 192,802, and in Germany August 29, 1924.

My invention refers to pharmaceutical products and more especially to combinations of dimethyl amido dimethyl phenyl pyrazolon. Its particular object is to provide compounds of the kind aforesaid which are readily soluble in water and have no acid reaction.

The salts hitherto obtained of dimethyl amido dimethyl phenyl pyrazolon either dissolve in water only with difficulty or have an acid reaction and therefore are not adapted for use in cases where acid preparations must be avoided and where a high degree of solubility is required, for instance for external use and for injections.

I have now ascertained that the soluble metal salts, for instance the sodium salts, of aromatic acids containing a carboxyl group linked to the nucleus, for instance of benzoic acid, salicylic acid, phenyl cinchoninic acid and the like or their derivatives such as for instance acidyl salicylic acid, and also the salts of these acids formed with organic bases, for instance hexamethylene tetramine or diethylene diamine, if combined with dimethyl amido dimethyl phenyl pyrazolon or with organic salts thereof and with soluble complex salts of the acids mentioned above, such as for instance a double salt of caffeine, will form with its stable complex compounds characterized by the lack of acid reaction and by a high degree of solubility in water.

If the components, i. e. dimethyl amido dimethyl phenyl pyrazolon and the plurality of salts, are mixed and the mixture is subjected to pressure to form therefrom pills or tablets, which may be dissolved in water, the constituents of the mixture will react with each other and the complex compound will be formed or in the watery solution.

I may, however, also produce these compounds directly by preparing solutions, in water or in organic solvents, of the mixture of the constituents or by fusing these constituents together. From the solutions thus prepared the complex compounds can be obtained by evaporation.

Instead of starting from dimethyl amido dimethyl phenyl pyrazolon and an organic salt, I may also employ a mixture of an amine and an acid, from which such salt is formed.

I may combine the constituents in molecular proportion, the base to be combined with dimethyl amido dimethyl phenyl pyrazolon being preferably added in excess, since in such manner compounds are obtained, which dissolve even in cold water in the proportion of 1:1 or more. I have found that the therapeutical efficiency of these compounds is increased by their high solubility.

Concentrated solutions of the new compounds are particularly adapted for subcutaneous injection. If dissolved in an organic solvent, for instance glycerine, they can be utilized for percutaneous delivery by rubbing into the skin, and some oil is then preferably added to the solution.

I may, however, also combine the watery solutions with lanolin, which is known to take up a certain percentage of water, and owing to the great solubility of the new compound a quantity thereof can thus be incorporated in the lanolin which suffices to produce the desired therapeutical effect, an unguent with a high content of dissolved resorbable substance being thus obtained. I may for instance dissolve one part by weight of a compound as described in one part of glycerine of 80–90 per cent, or I may dissolve one part of the compound in 0.5 parts water and triturate the watery solution with 1 part lanolin, some glycerine, alcohol or the like being added, if desired.

Example 1

1 molecule of dimethyl amido dimethyl phenyl pyrazolon is combined with 1 molecule of a caffeine salicylic sodium salt and 1 molecule of a phenyl cinchoninic sodium salt by dissolving the constituents in water.

The compound resulting on evaporating the water is

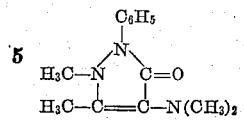 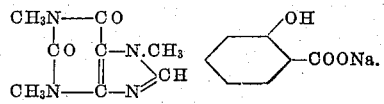

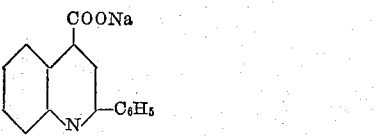

Example 2

2 molecules of dimethyl amido dimethyl phenyl pyrazolon are combined with 1 molecule of a caffeine salicylic sodium salt and 2 molecules of sodium salicylate by mixing the components, and melting. The resulting melt contains the combination

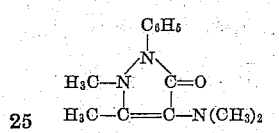 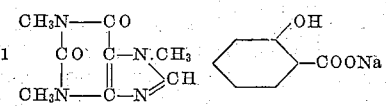

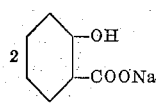

Example 3

3 molecules of dimethyl amido dimethyl phenyl pyrazolon are mixed and/or molten with 1 molecule of caffeine sodium benzoate and 3 molecules of calcium salicylate.
After dissolution results

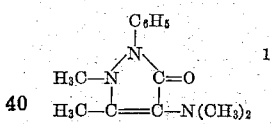 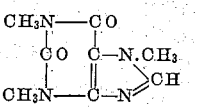 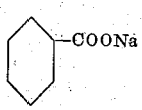

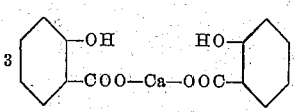

Example 4

3 molecules of dimethyl amido dimethyl phenyl pyrazolon are combined, by mixing and dissolving or melting, with 1 molecule of caffeine sodium salicylate and 6 molecules of sodium salicylate to form a solution of

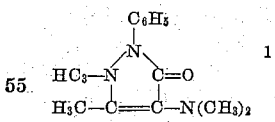 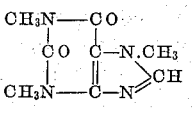 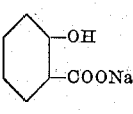

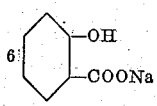

Example 5

3 molecules of dimethyl amido dimethyl phenyl pyrazolon are combined with 1 molecule of a caffeine phenyl cinchoninic sodium salt and 6 molecules of a phenyl cinchoninic sodium salt. Dissolution of the product leads to the formation of action of one molecule dimethyl amido dimethyl phenyl pyrazolon, of a soluble sim-

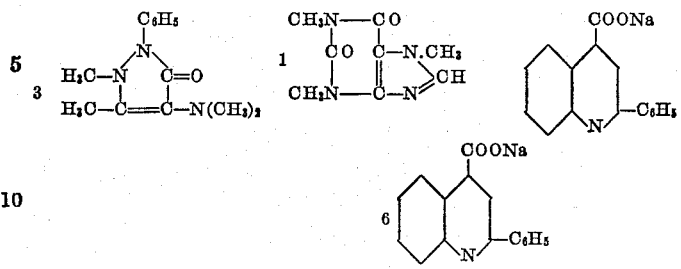

Various changes may be made in the details of the operation and particularly in the proportions of the ingredients used without departing from the invention or sacrificing the advantages thereof.

I claim:—

1. As a new composition of matter, the complex compound resulting from the interaction of one molecule of dimethyl amido dimethyl phenyl pyrazolon and a simple salt and a complex salt of an aromatic hydroxy-acid containing a carboxyl group linked to the nucleus.

2. As a new composition of matter, the complex compound resulting from the interaction of one molecule dimethyl amido dimethyl phenyl pyrazolon with at least one molecule of a simple salt of an aromatic hydroxy-acid containing a carboxyl group linked to the nucleus and of a complex salt of such acid containing caffeine.

3. As a new composition of matter, the complex compound resulting from the interaction of one molecule dimethyl amido dimethyl phenyl pyrazolon with at least one molecule of a salicylate and of a complex salt of an aromatic hydroxy-acid containing a carboxyl group linked to the nucleus containing caffeine.

4. As a new composition of matter, the complex compound resulting from the interaction of one molecule dimethyl amido dimethyl phenyl pyrazolon, a salicylate and a complex salicylate containing caffeine.

5. As a new composition of matter the complex compound resulting from the interaction of one molecule dimethyl amido dimethyl phenyl pyrazolon, a soluble simple salt of an aromatic acid containing a carboxyl group linked to the nucleus, and a soluble complex salt of an aromatic acid of this type.

6. As a new composition of matter the complex compound resulting from the interaction of one molecule dimethyl amido dimethyl phenyl pyrazolon, of a soluble simple salt of an aromatic hydroxy acid containing a carboxyl group linked to the nucleus, and a soluble complex salt of an aromatic acid of this type.

7. As a new composition of matter the complex compound resulting from the interaction of one molecule dimethyl amido dimethyl phenyl pyrazolon, of a soluble simple salicylate and a soluble complex salt of an aromatic acid containing a carboxyl group linked to the nucleus.

8. As a new composition of matter the complex compound resulting from the interaction of one molecule dimethyl amido dimethyl phenyl pyrazolon, of a soluble simple salt of phenyl cinchoninic acid and a soluble complex salt of an aromatic hydroxy acid containing a carboxyl group linked to the nucleus.

9. As a new composition of matter the complex compound resulting from the interaction of one molecule dimethyl amido dimethyl phenyl pyrazolon of a soluble simple salt of an aromatic acid containing a carboxyl group linked to the nucleus and a soluble complex salt of salicylic acid.

10. As a new composition of matter the complex compound resulting from the interaction of one molecule dimethyl amido dimethyl phenyl pyrazolon of a soluble simple salt of an aromatic acid containing a carboxyl group linked to the nucleus and a soluble complex salt of phenyl cinchoninic acid.

11. As a new composition of matter the complex compound resulting from the interaction of one molecule dimethyl amido dimethyl phenyl pyrazolon of a soluble simple salt of an aromatic acid containing a carboxyl group linked to the nucleus and a soluble complex salt of an aromatic acid of this type containing caffeine.

In testimony whereof I affix my signature.

REINHOLD GRÜTER.